United States Patent
Pachet et al.

(10) Patent No.: US 9,110,817 B2
(45) Date of Patent: Aug. 18, 2015

(54) METHOD FOR CREATING A MARKOV PROCESS THAT GENERATES SEQUENCES

(75) Inventors: Francois Pachet, Paris (FR); Pierre Roy, Paris (FR); Gabriele Barbieri, Paris (FR)

(73) Assignee: Sony Corporation, Tokyo (JP)

( * ) Notice: Subject to any disclaimer, the term of this patent is extended or adjusted under 35 U.S.C. 154(b) by 584 days.

(21) Appl. No.: 13/423,539

(22) Filed: Mar. 19, 2012

(65) Prior Publication Data

US 2012/0246209 A1    Sep. 27, 2012

(30) Foreign Application Priority Data

Mar. 24, 2011   (EP) ..................................... 11159618

(51) Int. Cl.
*G06F 17/10* (2006.01)
*G10H 1/00* (2006.01)

(52) U.S. Cl.
CPC .............. *G06F 17/10* (2013.01); *G10H 1/0025* (2013.01); *G10H 2210/115* (2013.01); *G10H 2250/015* (2013.01)

(58) Field of Classification Search
None
See application file for complete search history.

(56) References Cited

U.S. PATENT DOCUMENTS

| 2002/0194984 | A1 | 12/2002 | Pachet | |
| 2005/0228649 | A1* | 10/2005 | Harb et al. | .................... 704/205 |
| 2007/0282934 | A1* | 12/2007 | Luzzi et al. | .................... 708/250 |
| 2011/0010321 | A1 | 1/2011 | Pachet et al. | |

FOREIGN PATENT DOCUMENTS

| EP | 1 265 221 A1 | 12/2002 |
| EP | 1 274 069 A2 | 1/2003 |

OTHER PUBLICATIONS

Eugene C. Freuder, "A Sufficient Condition for Backtrack-Free Search", Journal of the Association for Computing Machinery, vol. 29, No. 1, Jan. 1982, pp. 24-32.
Francois Pachet et al., "Markov constraints: steerable generation of Markov sequences", © The Author(s) 2010, published with open access at Springerlink.com, Published online: Sep. 18, 2010, 25 Pages.

* cited by examiner

*Primary Examiner* — Michael D Yaary
(74) *Attorney, Agent, or Firm* — Oblon, McClelland, Maier & Neustadt, L.L.P.

(57) ABSTRACT

The present invention relates to a method for creating a Markov process that generates sequences. Each sequence has a finite length L, comprises items from a set of a specific number n of items, and satisfies one or more control constraints specifying one or more requirements on the sequence. The method comprises the steps of receiving data defining an initial Markov process of a specific order d and having an initial probability distribution and of receiving data defining one or more control constraints. The method further comprises the step of generating data defining intermediary matrices, each matrix being of dimension nd by n, by zeroing out transitions in the initial Markov process data that are forbidden by the one or more control constraints.

25 Claims, 7 Drawing Sheets

$$Z^{(0)} = \begin{pmatrix} 1/2 & 1/6 & 1/3 \end{pmatrix} \quad Z^{(1)} = \begin{pmatrix} 1/2 & 1/4 & 1/4 \\ 1/2 & 0 & 1/2 \\ 1/2 & 1/4 & 1/4 \end{pmatrix}$$

$$Z^{(2)} = \begin{pmatrix} 1/2 & 0 & 1/4 \\ 1/2 & 0 & 1/2 \\ 1/2 & 0 & 1/4 \end{pmatrix} \quad Z^{(3)} = \begin{pmatrix} 0 & 1/4 & 0 \\ 0 & 0 & 0 \\ 0 & 1/4 & 0 \end{pmatrix}$$

Fig. 5

$$\tilde{Z}^{(0)} = \begin{pmatrix} 1/2 & 1/6 & 1/3 \end{pmatrix} \quad \tilde{Z}^{(1)} = \begin{pmatrix} 1/2 & 1/4 & 1/4 \\ 1/2 & 0 & 1/2 \\ 1/2 & 1/4 & 1/4 \end{pmatrix}$$

$$\tilde{Z}^{(2)} = \begin{pmatrix} 2/3 & 0 & 1/3 \\ 1/2 & 0 & 1/2 \\ 2/3 & 0 & 1/3 \end{pmatrix} \quad \tilde{Z}^{(3)} = \begin{pmatrix} 0 & 1 & 0 \\ 0 & 0 & 0 \\ 0 & 1 & 0 \end{pmatrix}$$

Fig. 5a $$\tilde{M}^{(0)} = \begin{pmatrix} \frac{39}{77} & \frac{12}{77} & \frac{26}{77} \end{pmatrix} \quad \tilde{M}^{(1)} = \begin{pmatrix} 6/13 & 4/13 & 3/13 \\ 1/2 & 0 & 1/2 \\ 6/13 & 4/13 & 3/13 \end{pmatrix}$$

$$\tilde{M}^{(2)} = \begin{pmatrix} 2/3 & 0 & 1/3 \\ 1/2 & 0 & 1/2 \\ 2/3 & 0 & 1/3 \end{pmatrix} \quad \tilde{M}^{(3)} = \begin{pmatrix} 0 & 1 & 0 \\ 0 & 0 & 0 \\ 0 & 1 & 0 \end{pmatrix}$$

Fig. 6

| Melodies | Probabilities |
|---|---|
| CCCD | 1/32 |
| CCED | 1/64 |
| CECD | 1/64 |
| CEED | 1/128 |
| CDCD | 1/64 |
| CDED | 1/64 |
| ECCD | 1/48 |
| ECED | 1/96 |

| Melodies | Probabilities |
|---|---|
| EECD | 1/96 |
| EEED | 1/192 |
| EDCD | 1/96 |
| EDED | 1/96 |
| DCCD | 1/96 |
| DCED | 1/192 |
| DECD | 1/96 |
| DEED | 1/192 |

Fig. 7

| Melodies | Probabilities |
|---|---|
| CCCD | 12/77 (1/32) |
| CCED | 6/77 (1/64) |
| CECD | 6/77 (1/64) |
| CEED | 3/77 (1/128) |
| CDCD | 6/77 (1/64) |
| CDED | 6/77 (1/64) |
| ECCD | 8/77 (1/48) |
| ECED | 4/77 (1/96) |

| Melodies | Probabilities |
|---|---|
| EECD | 4/77 (1/96) |
| EEED | 2/77 (1/192) |
| EDCD | 4/77 (1/96) |
| EDED | 4/77 (1/96) |
| DCCD | 4/77 (1/96) |
| DCED | 2/77 (1/192) |
| DECD | 4/77 (1/96) |
| DEED | 2/77 (1/192) |

Fig. 8

| Melodies | Probabilities | Melodies | Probabilities |
|---|---|---|---|
| CDEC | 1/4 (1/48) = 12:1 | DECD | 1/12 (1/48) = 4:1 |
| CEDC | 1/4 (1/96) = 24:1 | ECDE | 2/9 (1/48) = 10.6:1 |
| DCED | 1/12 (1/96) = 8:1 | EDCE | 1/9 (1/96) = 10.6:1 |

Fig. 9

METHOD FOR CREATING A MARKOV PROCESS THAT GENERATES SEQUENCES

CROSS-REFERENCE TO RELATED APPLICATIONS

The present application claims priority of European patent application EP 11 159 618.5 filed on Mar. 24, 2011.

FIELD OF THE INVENTION

The present invention relates to a method and sequence generator for generating sequences using a Markov process, in particular in the framework of control constraint satisfaction. The present invention also relates to a computer program and a computer readable non-transitory medium for implementing said method.

BACKGROUND OF THE INVENTION

Markov processes, or also called Markov models or Markov chains, are a popular modeling tool used in content generation applications, such as, for example, text generation, music composition and interaction. Markov processes of order 1 are based on the "Markov hypothesis" which states that the future state of a sequence depends only on the last state, i.e.:

$$p(s_i|s_1, \ldots, s_{i-1}) = p(s_i|s_{i-1}).$$

There are systems which use Markov processes to generate finite-length sequences that imitate a given style. For example, a system, also known as the "Continuator", is disclosed in US 2002/194984 A1. It uses a Markov model to react interactively to music input. It has the capacity to faithfully imitate arbitrary musical styles, at least for relatively short time frames. Indeed, the Markov hypothesis basically holds for most melodies played by users (from children to professionals) in many styles of tonal music (classical, jazz, pop, etc.). Furthermore, a variety of outputs can be produced for a given input. All continuations produced are stylistically convincing, thereby giving the sense that the system creates infinite, but plausible, possibilities from the user's style.

It is often desirable to enforce specific control constraints on the sequences to generate. Unfortunately, control constraints are not compatible with Markov processes, as they induce long-range dependencies that violate the Markov hypothesis of limited memory. Thus, in such interactive contexts, the problem of control constraint satisfaction is a particular issue.

It is outlined in US 2011/0010321 A1 that control constraints raise a fundamental issue since they establish relationships between items that violate the Markov hypothesis. US 2011/0010321 A1 shows that the reformulation of the problem as a constraint satisfaction problem allows, for arbitrary sets of control constraints, to compute optimal, singular solutions, i.e., sequences that satisfy control constraints while being optimally probable.

However, what is often needed in practice is a distribution of good sequences. For this purpose, the approach of US 2011/0010321 A1 is not suitable, as it does not produce a distribution of sequences, but only optimal solutions. Furthermore, it involves a complete search-optimization algorithm, which is not suitable for real-time use.

BRIEF SUMMARY OF THE INVENTION

It is an object of the present invention to provide a method and sequence generator for generating sequences using a Markov process that is computationally less expensive, which means that many sequences can be computed at little computing cost, and which scales up well, which means that long sequences can be generated in little computing time. It is a further object of the present invention to provide a corresponding computer program and computer readable non-transitory medium for implementing said method.

According to an aspect of the present invention there is provided a method for creating a Markov process that generates sequences, each sequence having a finite length L, comprising items from a set of a specific number n of items, and satisfying one or more control constraints specifying one or more requirements on the sequence, the method comprising:

receiving data defining an initial Markov process of a specific order d and having an initial probability distribution;

receiving data defining one or more control constraints;

generating data defining intermediary matrices, each matrix being of dimension $n^d$ by n, by zeroing out transitions in the initial Markov process data that are forbidden by the one or more control constraints;

generating data defining a final non-homogeneous Markov process by processing the intermediary matrices data, generating the sequences having the finite length L by using the final non-homogeneous Markov process data with random walk.

According to a further aspect of the present invention there is provided a sequence generator for creating a Markov process that generates sequences, each sequence having a finite length L, comprising items from a set of a specific number n of items, and satisfying one or more control constraints specifying one or more requirements on the sequence, the generator comprising:

a Markov process unit adapted to provide data defining an initial Markov process of a specific order d and having an initial probability distribution;

a control unit adapted to provide data defining one or more control constraints;

a first processing unit adapted to generate data defining intermediary matrices, each matrix being of dimension $n^d$ by n, by zeroing out transitions in the initial Markov process data that are forbidden by the one or more control;

a second processing unit adapted to generate data defining a final non-homogeneous Markov process by processing the intermediary matrices data, a sequence generating unit adapted generate the sequences having the finite length L by using the final non-homogeneous Markov process data with random walk.

According to still further aspects a computer program comprising program means for causing a computer to carry out the steps of the method according to the present invention, when said computer program is carried out on a computer, as well as a computer readable non-transitory medium having instructions stored thereon which, when carried out on a computer, cause the computer to perform the steps of the method according to the present invention are provided.

Preferred embodiments of the invention are defined in the dependent claims. It shall be understood that the claimed sequence generator, the claimed computer program and the claimed computer readable medium have similar and/or identical preferred embodiments as the claimed method and as defined in the dependent claims, and vice versa.

The present invention is based on the idea to exploit the fruitful connection between Markov processes and constraint satisfaction, but in a random walk setting, thus without search algorithm. The present invention enables to compile control constraints in the form of a non-homogeneous Markov process. This non-homogeneous Markov process can in turn be used straightforwardly with random walk to generate sequences. More complex constraints having a large control constraints scope can be handled, provided they can be filtered to obtain a backtrack-free constraint satisfaction problem (CSP), at the cost of inaccurate probabilities.

The approach generates all the sequences satisfying the constraints with no search, so is suitable for real-time, interactive applications. Also, opposed to generating one optimal solution, the approach generates a statistical distribution of suitable solutions, which is what is needed in practice in content generation applications, for example in music generation/composition applications. It is shown that a backtrack free constraint satisfaction problem can be transformed into a non-homogenous Markov process and vice versa. Thus, a bridge between Markov generation and constraint satisfaction is established.

In particular, when the control constraints scope does not exceed the order of the Markov process (for example, unary and binary adjacent for Markov processes of order-1) they can be "compiled" into a new non-homogeneous Markov process that maintains the probability distribution of the initial Markov process. This yields the advantage of retaining the simplicity of random walk, while ensuring that control constraints are satisfied.

Also, the present invention enables to solve the so-called zero-frequency problem, which arises during random walk, when an item with no continuation is chosen, in particular when another item with a continuation could have been chosen. In other words, the invention enables to generate sequences with non-zero probability (if such sequences exist), rather than generating sequences with a zero probability. The invention guarantees that such sequences with non-zero probability are generated and that they also satisfy the control constraints. In particular for control constraints that remain within the Markov scope, an arc-consistency algorithm enables to solve the zero-frequency problem.

BRIEF DESCRIPTION OF THE DRAWINGS

These and other aspects of the present invention will be apparent from and explained in more detail below with reference to the embodiments described hereinafter. In the following drawings

FIG. 3 shows two exemplary input sequences in form of melodies used to estimate an initial Markov process according to a first embodiment of the method;

FIG. 4 shows an exemplary initial Markov process estimated from the input sequences of FIG. 3 and used in the first embodiment of the method;

FIG. 5 shows exemplary intermediary matrices according to the first embodiment of the method;

FIG. 5a shows exemplary individually normalized intermediary matrices according to the first embodiment of the method;

FIG. 6 shows an exemplary final non-homogenous Markov process according to the first embodiment of the method;

FIG. 7 shows a table of sequences and their corresponding probabilities according to the exemplary initial Markov process of FIG. 4;

FIG. 8 shows a table of sequences and their corresponding probabilities according to the exemplary final non-homogenous Markov process of FIG. 6;

FIG. 9 shows an exemplary table of sequences and their corresponding probabilities according to a second embodiment of the method;

DETAILED DESCRIPTION OF THE INVENTION

Figure 1:
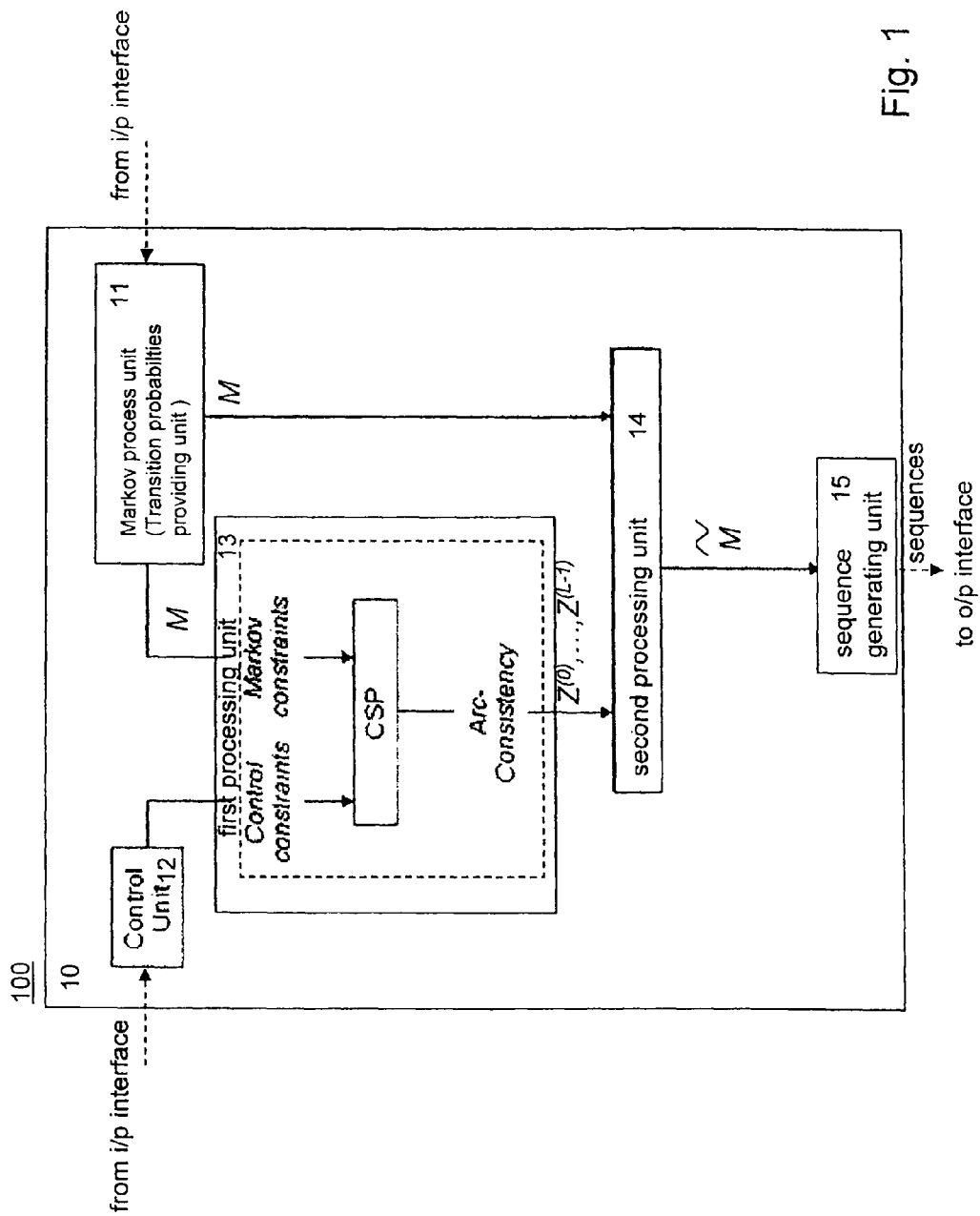
FIG. 1 shows a schematic diagram of a sequence generator according to an embodiment.

FIG. 1 shows a schematic diagram of a sequence generator 100 according to an embodiment. In particular, FIG. 1 shows the details of a processing part 10 of the sequence generator 100 (e.g. a processor or other suitable processing part). The sequence generator 100 creates a non-homogenous Markov process $\tilde{M}$ that generates sequences, wherein each sequence has a finite length L, comprises items from a set of a specific number n of items, and satisfies one or more control constraints specifying one or more requirements on the sequence. As an example, at least one of the control constraints can require a specific item to be at a specific position within the sequence, or can require a specific transition between two positions within the sequence. Each sequence can for example comprise items of music notes, text components or drawings, or any other suitable type of items. The sequence generator 100 comprises a Markov process unit 11 adapted to provide data defining an initial Markov process M of a specific order d and having an initial probability distribution. Thus, the Markov process unit 11 provides transition probabilities. These transition probabilities define a probability for each sequence. The sequence generator 100 further comprises a control unit 12 adapted to provide data defining one or more control constraints. The sequence generator 100 further comprises a first processing unit 13. The control constrains data provided by the Markov process unit 11 and the initial Markov process M data provided by the control unit 12 are each supplied to the first processing unit 13. The control constraints data received from control unit 12 and the initial Markov process M data received from Markov process unit 11 are used to define a constraint satisfaction problem CSP. The first processing unit 13 is adapted to generate data defining intermediary matrices $Z^{(0)}, \ldots, Z^{(L-1)}$, wherein each matrix is of dimension $n^d$ by n. This is done by filtering out transitions in the constraint satisfaction problem CSP, that are forbidden by the one or more control constraints, using a local consistency algorithm, in particular an arc-consistency algorithm, as illustrated in FIG. 1. Then, the transitions in the initial Markov process M data are zeroed out that are forbidden by the one or more control constraints. In particular, the transitions in the initial Markov process M data are zeroed out that correspond to the transitions that are/have been filtered out in the constraint satisfaction problem CSP using the local consistency algorithm, like the arc-consistency algorithm. Alternatively, the local consistency algorithm can also be a path consistency algorithm or strong-k-algorithm. In general, an arc-consistency algorithm as the local consistency algorithm can be used when the constraints are unary and binary sequential constraints, a paired consistency algorithm can be used as the local consistency algorithm when the control constraints are unary, binary and tenary sequential constraints, and a strong-k-consistency algorithm can be used as the local consistency algorithm when the control constraints are sequential constraints of arity at most k.

In FIG. 1, the sequence generator 100 further comprises a second processing unit 14 adapted to generate data defining a final non-homogeneous Markov process $\tilde{M}$ by processing the intermediary matrices $Z^{(0)}, \ldots, Z^{(L-1)}$ data received from the first processing unit 13. Thus, the second processing unit 14 creates a non-homogeneous Markov process $\tilde{M}$. A non-homogeneous Markov process is a Markov process whose transition matrices change over time. A non-homogeneous Markov process of length L is represented by L−1 transition matrices $\tilde{M}^{(i)}$, i=1, ..., L−1 (of dimension $n^d$ by n), and a prior vector $\tilde{M}^{(0)}$ (of dimension 1 by $n^d$) used to draw the first item of a generated sequence.

The sequence generator 100 further comprises a sequence generating unit 15 which receives the final non-homogeneous Markov process $\tilde{M}$ data from the second processing unit 14. The sequence generating unit 15 is adapted to generate the sequences having the finite length L by using the final non-homogeneous Markov process $\tilde{M}$ data with random walk. Random walk means that the first item of a sequence is chosen randomly using the prior probabilities, and, then, a subsequent item is drawn using the Markov process, and appended to the first item. This is iterated to produce a sequence of length L.

Figure 2:
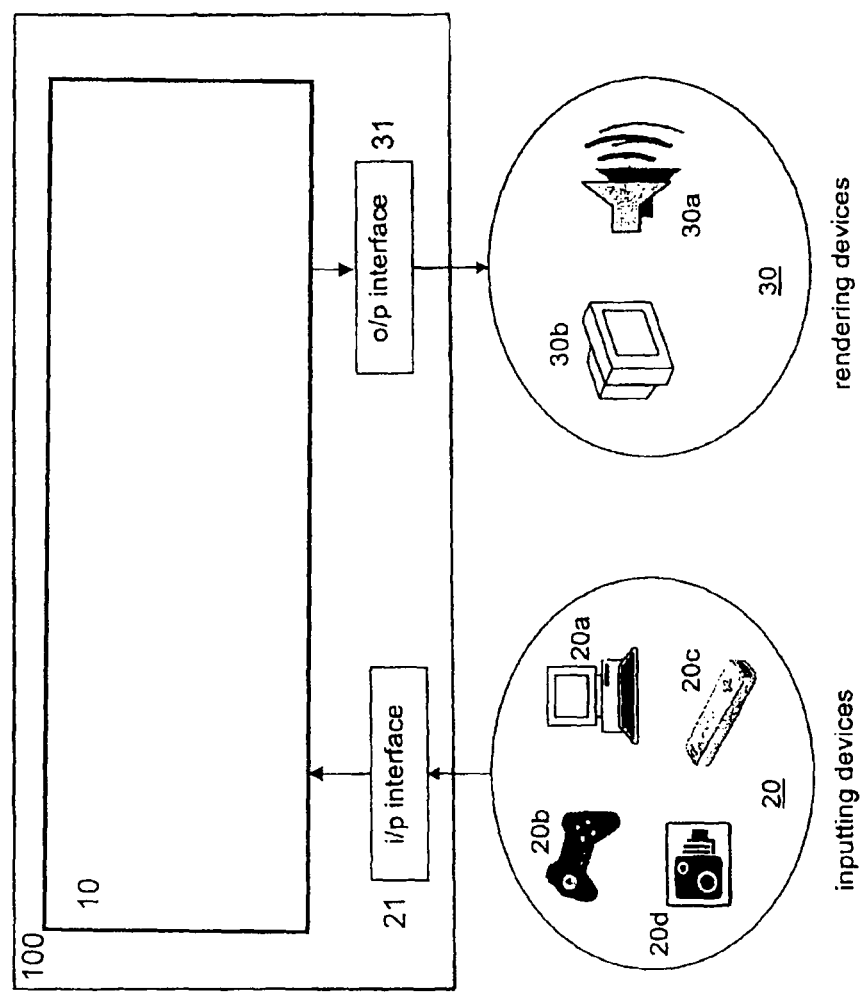
FIG. 2 shows a schematic diagram of the sequence generator according to the embodiment of FIG. 1 in the context of input devices and rendering devices.

The generated sequences can for example be rendered to the user using an output interface. FIG. 2 shows a schematic diagram of the sequence generator 100 according to the embodiment of FIG. 1 in the context of input devices 20 and rendering devices 30. The generated sequences provided by the processing part 10, shown in FIG. 1, are output via the output interface 31 and can be rendered to the user by a rendering device 30, which may for example be a loudspeaker 30A, a monitor or other display device 30B, etc.

The sequence generator 100 may also comprise an input interface 21 adapted to receive user input. The input device 20 may for example be a keyboard, mouse, graphic tablet, touch screen or other device 20a that a user operates in order to interact with a user interface, such as a graphical user interface, a conventional game controller 20b comprising user operable buttons, levers and the like, a controller 20c which uses one or more accelerometer and the like to detect gestures made by a user (such as Nintendo's Wiimote), an image capture and analysis system 20d configured to detect and interpret user's gestures, etc. In particular, the input device 20 may be a gesture recognition device and/or a physiological sensor, in particular, a brain/neural sensor, a muscle activity sensor, a respiration/breath sensor or the like.

On the one hand, the input interface 21 can be adapted to receive one or more constraint inputs for generating the one or more control constraints data. These constraint inputs are then supplied to the control unit 12 from the input interface 21. Alternatively or cumulatively, the input interface 21 may be adapted to receive one or more input sequences for generating the initial Markov process M data. The input sequences are then supplied to the Markov process unit 11 from the input interface 21. The input sequence can be used to train or update the initial Markov process.

In a specific application, a user may play a musical phrase using a musical instrument, such as a music keyboard, in particular a MIDI keyboard. The phrase played by the user is then converted into a input sequence of symbols, representing a given dimension of music, such as pitch, duration, or velocity. The input sequence is then analyzed by the system to update the Markov process. When the phrase is finished, typically after a certain temporal threshold has passed, the system generates a new sequence, thus a new phrase, using the Markov process built so far. The user can then play another phrase, or interrupt the phrase being played, depending on the chosen interaction mode. Such incremental learning can create engaging dialogs with users, both with professional musicians and children.

With reference to FIG. 3 to FIG. 8, an example of a first embodiment of the method will now be explained, illustrated on an example of a melody generation problem.

An initial Markov process M, illustrated in FIG. 4, estimated from the two input sequences in form of melodies shown in FIG. 3. The order d of the initial Markov process is here 1. The initial Markov process M is represented by a prior vector $M^{(0)}$ of dimension 1 by $n^d$, thus 1 by 3, and a single transition matrix $M^{(1)}$ of dimension $n^d$ by n, thus 3 by 3.

In this example, sequences having the finite length L of 4 shall now be generated, thus 4-note melodies. The set of items to choose from is of the specific number n of 3 items, namely the notes C, D and E. There are 60 possible such melodies with non-zero probabilities. For instance, sequence CDED has probability:

$$p_M(CDED) = p_M(C)p_M(D|C)p_M(E|D)p_M(D|E) = \frac{1}{64}.$$

Now, a control constraint is for example that the last pitch be a D. There are only 16 such sequences, as illustrated in FIG. 7. The goal is to build a non-homogeneous Markov process $\tilde{M}$ that generates exactly these 16 melodies with the same probability distribution. In general, of course, the solutions and their probabilities shown in FIG. 7 are not known.

It is now shown how to build the non-homogeneous Markov process $\tilde{M}$ given the initial (homogeneous) Markov process M and control constraints. Fixed-length sequences of finite length L shall be generated, from a Markov process, that satisfy the control constraints. To use a random walk approach, a non-homogeneous Markov process $\tilde{M}$ is needed that generates exactly the sequences satisfying the control constraints with the probability distribution defined by the initial Markov process M. In general, it is not possible to find such a Markov process because control constraints violate the Markov property, as outlined in US 2011/0010321 A1. However, when control constraints remain within the Markov scope, which means that the scope of the control constraints is equal or smaller than the order of the Markov process, such a Markov process exists and can be created with a low complexity.

In the first embodiment of the method, the Markov process is of order 1 and the single transition matrix $M^{(1)}$ is a stochastic transition matrix (i.e. each row sums up to 1), shown in FIG. 4.

In general, a Markov process M is defined over a finite state space $A=\{a_1, \ldots, a_n\}$. A sequence s of length L is denoted by $s=s_1, \ldots, s_L$ with $s_i \in A$. S is the set of all sequences of length L generated by M with a non-zero probability:

$$p_M(s) = p_M(s_1) \cdot p_M(s_2|s_1) \ldots p_M(s_L|s_{L-1}).$$

The sequences to be generated, having the finite length L, are represented by the finite-domain constrained variables $\{V_1, \ldots, V_L\}$, each with domain A. Markov properties, as Markov constraints $\{K_1, \ldots, K_{L-1}\}$ on these variables $\{V_1, \ldots, L_L\}$, are defined, based on the initial Markov process M and its transition probabilities. Control constraints are also represented as finite-domain constraints. Using the Markov properties/Markov constraints and the control constraints, a constraint satisfaction problem CSP is defined. The set of solutions is denoted by $S_C$. The non-homogenous Markov process $\tilde{M}$ to be created should verify:

$$p_{\tilde{M}}(s)=0 \text{ for } s \notin S_C, \quad (I)$$

$$p_{\tilde{M}}(s)=p_M(s|s \in S_C) \text{ otherwise}. \quad (II)$$

These properties state that $\tilde{M}$ generates exactly the sequences $s \in S_C$. Most importantly, sequences in $S_C$ have the same probabilities in M and $\tilde{M}$ up to a constant factor $\alpha = p_M(s \in S_C)$, i.e. $\forall s \in S_C$, $p_{\tilde{M}}(s)=1/\alpha \cdot p_M(s)$. In the running example, $\alpha = \sigma$.

For a certain class of induced CSPs, hereafter referred to as BinarySequential CSPs, there exists a non-homogeneous Markov process $\tilde{M}$ that satisfies (I) and (II).

The scope of a control constraint is the maximum number of consecutive items on which the constraint holds. A Binary-Sequential CSP is a CSP that contains only constraints whose scope remains within the scope of the Markov order. With a Markov order of 1, these constraints consist in 1) unary constraints and 2) binary constraints among adjacent variables.

In the following it will now be described how to build $\tilde{M}$ from M and its induced Binary-Sequential CSP. Further, it will be shown that $\tilde{M}$ achieves the desired properties, namely satisfies (I) and (II).

The final non-homogeneous Markov process $\tilde{M}$ is obtained by applying two successive transformations to the initial Markov process M. The first transformation exploits the induced CSP to filter out state transitions that are explicitly or implicitly forbidden by the constraints. This is achieved by replacing the corresponding transition probabilities by zeros in the initial transition matrices. A side-effect is that the transition matrices are not stochastic anymore, which means that rows do not sum up to 1 any longer. The second transformation consists in renormalizing those matrices to obtain a proper non-homogeneous Markov process $\tilde{M}$. These two successive transformations will now be explained in more detail.

A Binary-Sequential CSP with unary control constraints $U_1, \ldots, U_L$ and binary constraints $B_1, \ldots, B_{L-1}$ is considered. $U_i$ defines the states that can be used at position i in the sequence. $B_i$ defines the allowed state transitions between positions i and i+1. Markov constraints, denoted by $K_1, \ldots, K_{L-1}$, are posted on all pairs of adjacent variables $V_1, \ldots V_L$. Markov constraints $K_1, \ldots, K_{L-1}$ represent the following relation:

$$\forall i, \forall a, b \in A, K_i = \text{true} \Leftrightarrow p_M(b|a) > 0.$$

The CSP induced by the example of the first embodiment of the method, as shown with respect to FIG. 4 to FIG. 8, is the following:

$$V_1 \xrightarrow{K_1} V_2 \xrightarrow{K_2} V_3 \xrightarrow{K_3} V_4 \leftarrow U_4$$
$$\{C,D,E\} \quad \{C,D,E\} \quad \{C,D,E\} \quad \{C,D,E\} \quad V_4=\{D\}$$

The first step is to make the induced CSP arc-consistent. An arc-consistency algorithm consists in propagating the constraints in the whole CSP, through a fixed-point algorithm that considers constraints individually. This ensures that each constraint c holding on variables $V_i$ and $V_j$ satisfies:

$$\forall x \in D(V_i), \exists y \in D(V_j) \text{ such that } c(x,y)=\text{true}:$$

It is important to note here that enforcing arc-consistency on a Binary-Sequential CSP is sufficient to allow the computation of the transition matrices once for all, prior to the generation, with no additional propagation. This can be shown as follows:

Proposition: If the induced CSP is arc-consistent, then for all consistent partial sequences $s_1 \ldots s_i$ (i.e. sequences that satisfy all the constraints between variables $V_1, \ldots V_i$), the following properties hold:

$$\exists s_{i+1} \in D(V_{i+1}) \text{ such that } s_1 \ldots s_i s_{i+1} \text{ is consistent}. \quad (P1)$$

$$s_1 \ldots s_i s_{i+1} \text{ is consistent}, \Leftrightarrow s_i s_{i+1} \text{ is consistent}. \quad (P2)$$

Proof. The induced CSP is of width 2 as its constraint network is a tree. Arc-consistency enables a backtrack-free resolution of a CSP of width 2, therefore every partial consistent sequence can be extended to a solution, which is equivalent to P1. The condition in P2 is obviously sufficient; it is also necessary as no constraint links $V_{i+1}$ back to any other variable than $V_i$.

Arc-consistency of the Markov constraints $K_i$ can be achieved efficiently with the following propagators:

On instantiation: If $V_i$ is instantiated with $a \in A$, remove every $b \in A$ such that $p_M(b|a)=0$ from the domain of $V_i+1$. Conversely, if $V_i+1$ is instantiated with $b \in A$, remove all the $a \in A$ such that $p_M(b|a)=0$ from the domain of $V_i$.

On removal: If $a \in A$ is removed from the domain of $V_i$, remove all the $b \in A$ such that $p_M(b|c)=0$, $\forall c \neq a$ from the domain of $V_{i+1}$. The same strategy is applied when a value is removed from the domain of $V_{i+1}$. This can be implemented efficiently by associating a support counter with each value in the domain of $V_{i+1}$.

Arc-consistency of binary control constraints can be implemented with a general binary arc-consistency algorithm or a specific one, depending on the nature of the constraint. Arc-consistency of the induced CSP necessitates enforcing arc-consistency of all constraints until a fixed-point is reached, i.e., no more values are removed.

In the example shown with respect to FIG. 4 to FIG. 8, arc-consistency removes D from the domain of $V_3$ yielding the following domains:

$$V_1 \xrightarrow{K_1} V_2 \xrightarrow{K_2} V_3 \xrightarrow{K_3} V_4$$
$$\{C,D,E\} \quad \{C,D,E\} \quad \{C,E\} \quad \{D\}$$

In general, the zero-frequency problem could arise during random walk, when an item with no continuation is chosen. However, it should be noted that arc-consistency of Markov constraints as such solves the zero-frequency problem, regardless of control constraints. No choice made during the random walk can lead to a zero-frequency prefix. More specifically, when sequences with non-zero probability exist that satisfy the control constraints, these sequences will be generated. However, when no such sequence with a non-zero probability that satisfies the control constraints exists (i.e. every sequence that satisfies the control constraints has a zero probability), this will be detected when using the arc-consistency algorithm. Then, a constraint relaxation method can be used. For example, the constraint relaxation method can be implemented in that each control constraint is associated to a numeric weight (such as a floating point number between 0 and 1). If no solution exists, the constraint with the minimum weight is discarded. If a solution to the new (simpler) problem exists, this solution is generated. If no solution exists, the constraint with the next minimum weight is discarded and so on, until a solution is found or no constraint is left in the CSP. If there is no solution even after all the constraints have been removed, then a standard Markov generation method can be applied, like for example smoothing of transition probabilities.

Now, the matrices will be extracted. The goal is to generate a non-homogeneous Markov process, represented by a series of transition matrices. A series of non-homogeneous intermediary matrices $Z^{(0)}, \ldots, Z^{(L-1)}$ are obtained by zeroing, in the initial matrix $M^{(1)}$, the elements that correspond to values or transitions that were removed during arc-consistency. More precisely, the algorithm is:

Initialization:
$Z^{(0)} \leftarrow M_0$ (the prior probabilities of M),
$Z^{(i)} \leftarrow M, \forall I=1, \ldots, L-1$ (the transitions).
For each $a_k \leftarrow A$ removed from the domain of $V_i$:
$Z_{j,k}^{(i)} \leftarrow 0, \forall i=1, \ldots, n$ (set the k-th column to zero).
All forbidden transitions in the binary constraints should also be removed from the matrices:
$Z_{j,k}^{(i)} \leftarrow 0, \forall i, j, k$ such that $B_i(a_j, a_k)$=false.

The intermediary matrices $Z^{(0)}, \ldots, Z^{(L-1)}$ obtained for the illustrated example are shown in FIG. 5. As can be seen, modifying the initial matrix $M^{(1)}$ makes it non-stochastic anymore. In particular, at least one of the intermediary matrices $Z^{(0)}, \ldots Z^{(L-1)}$ is a non-stochastic transition matrix. Here, the intermediary matrices $Z^{(2)}$ and $Z^{(3)}$ are non-stochastic (i.e. not all of their rows sum up to 1). Thus, in the following, renormalization of the intermediary matrices to satisfy property (II) will be explained.

The final transition matrices $\tilde{M}^{(i)}$ of $\tilde{M}$ from the intermediary matrices $Z^{(i)}$ need to be built. First, the transition matrices are normalized individually, i.e. by dividing each row by its sum. FIG. 5a shows such individually normalized intermediary matrices $\hat{Z}^{(0)}, \ldots, \hat{Z}^{(L-1)}$. This produces a non-homogeneous Markov process, but this process does not satisfy property (II) above, as it generates sequences with a different probability distribution than the initial Markov process M. As can be seen in FIG. 5a, just as an example, $p_{\hat{Z}}$(CCCD)=1/6 and $p_{\hat{Z}}$(CDCD)=1/16. The ratio between these two probabilities (16/6) is different from the original ratio (64/32=2).

The normalization should indeed maintain the initial probability distribution. To do this, subsequently to individual normalization, the intermediary matrices $Z^{(0)}, \ldots, Z^{(L-1)}$ are processed using a renormalization algorithm. The renormalization algorithm maintains the initial probability distribution. It turns out that a simple right-to-left process can precisely achieve that. The idea is to back propagate the perturbations in the matrices induced by individual normalization, starting from the right-most one. Thus, the renormalization algorithm comprises back-propagating normalizations in the intermediary matrices $Z^{(0)}, \ldots, Z^{(L-1)}$, starting from the last matrix $Z^{(L-1)}$.

To do this, first the last matrix $Z^{(L-1)}$ is normalized individually. Then, the normalization is propagated from right to left, up to the prior vector $Z^{(0)}$. The elements of the matrices $\tilde{M}^{(i)}$ and the prior vector $\tilde{M}^{(0)}$ are given by the following recurrence relations:

$$\tilde{m}_{j,k}^{(L-1)} = \frac{z_{j,k}^{(L-1)}}{\alpha_j^{(L-1)}}, \quad \alpha_j^{(L-1)} = \sum_{k=1}^{n} z_{j,k}^{(L-1)}$$

$$\tilde{m}_{j,k}^{(i)} = \frac{\alpha_k^{(i+1)} z_{j,k}^{(i)}}{\alpha_j^{(i)}}, \quad \alpha_j^{(i)} = \sum_{k=1}^{n} \alpha_k^{(i+1)} z_{j,k}^{(i)} \quad 0 < i < L-1$$

$$\tilde{m}_k^{(0)} = \frac{\alpha_k^{(1)} z_k^{(0)}}{\alpha^{(0)}}, \quad \alpha^{(0)} = \sum_{k=1}^{n} \alpha_k^{(1)} z_k^{(0)}$$

By construction, when $\alpha_j^{(i)}=0$, the j-th columns of the preceding $Z^{(i)}$ contain only 0 as well. By convention, the division yields 0 since there is no normalization to back propagate. These coefficients can be computed in $O(L \times n^2)$. In the following it is shown that this non-homogeneous Markov process satisfies the two desired properties:

Proposition: The $\tilde{M}^{(i)}$ are stochastic matrices and the non-homogeneous Markov process $\tilde{M}$ defined by the $\tilde{M}^{(i)}$ matrices and the prior vector $\tilde{M}^{(0)}$ satisfies (I) and (II).

Proof. The $\tilde{M}^{(i)}$ matrices are stochastic by construction, i.e., each row sums up to 1. The probability of a sequence $s=s_1 \ldots s_L$ to be generated by $\tilde{M}$ is:

$$p_{\tilde{M}}(s) = p_{\tilde{M}}(s_1) \cdot p_{\tilde{M}}(s_2 | s_1) \cdot \ldots \cdot p_{\tilde{M}}(s_L | s_{L-1})$$

$$= \tilde{m}_{k_1}^{(0)} \cdot \tilde{m}_{k_1,k_2}^{(1)} \cdot \ldots \cdot \tilde{m}_{k_{L-1},k_L}^{(L-1)}$$

$$= \frac{1}{\alpha^{(0)}} \cdot z_{k_1}^{(0)} \cdot z_{k_1,k_2}^{(1)} \cdot \ldots \cdot z_{k_{L-1},k_L}^{(L-1)},$$

where $k_i$ is the index of $s_i$ in A. Hence, by construction of $Z^{(i)}$:

$$p_{\tilde{M}}=0 \text{ for } s=\in S_C, \quad (I)$$

$$p_{\tilde{M}}=1/\alpha^{(0)} \cdot p_M(s) \text{ otherwise}. \quad (II)$$

$\alpha^{(0)}$ is precisely the probability for sequences in M of satisfying the control constraints, i.e. $\alpha^{(0)}=p_M(S_C)$.

The final matrices of the final non-homogeneous Markov process $\tilde{M}$ for the illustrated example are shown in FIG. 6. The final non-homogeneous Markov process $\tilde{M}$ is represented by a prior vector $\tilde{M}^{(0)}$ of dimension 1 by n, thus 1 by 3, and L−1, thus 3, transition matrices $\tilde{M}^{(1)} \ldots \tilde{M}^{(L-1)}$ of dimension n by n, thus 3 by 3. Each of the transition matrices $\tilde{M}^{(0)} \ldots \tilde{M}^{(3)}$ of the final non-homogeneous Markov process $\tilde{M}$ is a stochastic transition matrix for non-zeroed rows. This means these matrices are stochastic except for rows which contain only zeroes.

It is interesting to observe that even the addition of a simple unary constraint (here, last item=D) has an impact that propagates back to the prior vector. In our example, $p_{\tilde{M}}$ (C) is slightly increased (from 0.5 to 0.506), $p_{\tilde{M}}$ (D) is decreased (from 0.1666 to 0.1558) and $p_{\tilde{M}}$ (E) increased (from 0.333 to 0.337).

FIG. 8 shows the probabilities of all sequences in $S_C$ according to the non-homogeneous Markov process $\tilde{M}$. The probabilities of M are illustrated in parenthesis for comparison reasons. These probabilities of the non-homogeneous Markov process shown in FIG. 8 are indeed equal to the initial probabilities shown in FIG. 7, to the constant multiplicative factor $\alpha^{(0)}=77/387$. Thus, the generated sequences have the initial probability distribution. In other words, for each of the generated sequences, a ratio of the probability of said sequence according to the final non-homogenous Markov process $\tilde{M}$ and the probability of said sequence according to the initial Markov process M is the same constant factor $\alpha^{(0)}$.

Thus it has been shown that the first embodiment of the method generates a Markov process that satisfies the desired properties. The complexity of the method is low, as it involves only performing arc-consistency once on the induced CSP, and a renormalization in $O(L \times n^2)$.

With reference to FIG. 9, an example of a second embodiment of the method will now be explained. Renormalization may have a small impact on the transition matrices, although difficult to quantify precisely. However, in practice, it may be interesting to sacrifice accuracy and skip the renormalization step (i.e., use only individual normalization). In that case, a larger scope of the control constraints can be handled. The only necessary condition is that the induced CSP should be made backtrack-free which means using a local consistency algorithm. This ensures that any choice performed during random walk leads to a sequence in $S_C$. Property P2 of the Binary-Sequential CSP is no longer true, so propagation is needed after each instantiation during random walk to filter out values made incompatible with the current choice. Additionally, the algorithm is considerably simplified. Transition matrices need not be constructed explicitly since their only use is to propagate the normalization. Instead, variable domains can be used directly to perform random draw at each step of the random walk, with a prior individual normalization of the initial matrix M. iThis means that arc-consistency does most of the job, which is to propagate the local effect of control constraints throughout the CSP.

In the example shown in FIG. 9, the control constraint is changed to: "any three consecutive items should be different". This can be implemented by posting an AllDiff constraint on all consecutive triplets of variables. Thus the control constraint is tenary. Such a constraint exceeds the Markov scope (order 1 here) so the induced CSP is not a Binary-Sequential CSP. However, the induced CSP can be made backtrack-free by applying path-consistency (or strong-3 consistency), with a complexity of $O(n^3)$. In the illustrated example, it turns out that the CSP is already path-consistent so no value is removed. $S_C$ now contains 6 sequences, whose probabilities are shown in FIG. 9. The probabilities are not equivalent to those in the initial Markov process M (see FIG. 7), but this approximation is the price to pay to get a random walk that satisfy those ternary constraints.

The embodiments above described the method for fixed order-1 Markov processes. However, the order d of the (initial) Markov process can also be two or higher. Generalization to order d consists in first introducing order-d Markov constraints, and second applying the rest of the method to $n^d \times n$ transition matrices (where rows are d-grams and columns are the state), instead of the n×n transition matrices described previously for order 1. In practice, most d-grams have no continuation, so sparse representations (graphs, oracles) are more appropriate than matrices. When a Markov process with an order d of 2 or higher is used, the control constraints are in particular of arity d+1. The local consistency algorithm used is then a strong-(d+1)-consistency algorithm.

Figure 10:
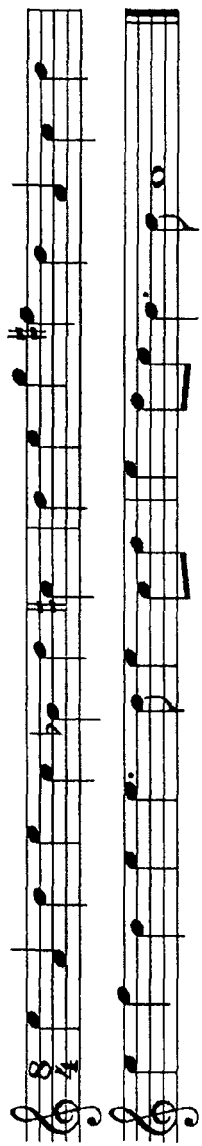
FIG. 10 shows an exemplary constraint input in form of a melody used to estimate an initial Markov process according to an exemplary implementation.
Figure 11:
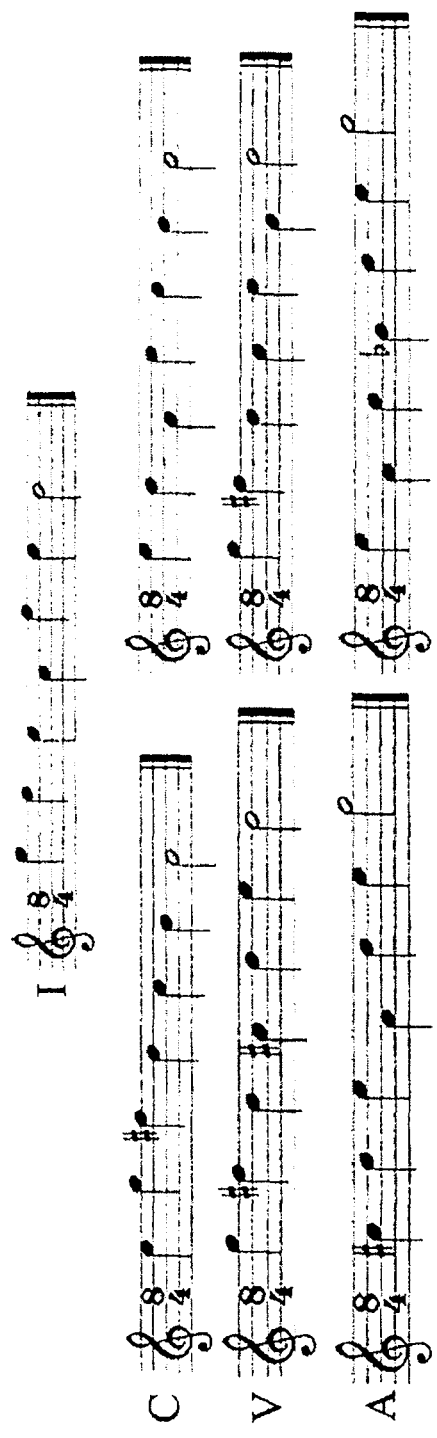
FIG. 11 shows an exemplary input sequence and corresponding generated sequences according to an exemplary implementation.

FIG. 10 and FIG. 11 show an example for an exemplary implementation of the sequence generator and method. For example, the first or second embodiment described above can be used in this example of the exemplary implementation. In this implementation there is a "style-imitation" sequence generator and method, in which requires control constraints on individual items at arbitrary positions. Another implementation could be a text generation application to generate text in the style of somebody or something, with additional constraints on rhymes and phrase structure.

Unary constraints can be used to represent various musical intentions, when producing a melody from an initial Markov process M, and an input sequence in form of a melody provided in real-time. For instance, the following types of melodic output can be defined:

Continuation: input is continued to produce a sequence of the same size. A constraint is posted on the last note to ensure that it is "terminal", i.e., occurred at the end of an input melody, to produce a coherent ending.

Variation: is generated by adding two unary constraints that the first and last notes should be the same, respectively, as the first and last notes of the input.

Answer is like a Continuation, but the last note should be the same as the first input note. This creates a phrase that resolves to the beginning, producing a sense of closure.

Thus, in general, if a control constraint requires that the last note of each sequence is a specific note it is called a Continuation. When a control constraint requires that the last note of each sequence is the same as the first note of the input sequence, it is called a Variation. When a first constraint requires that the first note of each output sequence is the same as the first note of the input sequence, and a second constraint requires that the last note of the output sequence is the same as the last note of the input sequence, it is called an Answer.

FIG. 10 shows an exemplary constraint input in form of a melody used to estimate an initial Markov process M. FIG. 11 shows an exemplary input sequence I and examples of generated sequences in form of continuations C, variations V and answers A, built from the initial Markov process M and the constraints corresponding to each melody type, from the constant input sequence I. It is clear that these melodies belong to the corresponding musical categories. Continuations end naturally, with the same 3 notes as the input (a consequence of the constraint on the last note). Variations sound similar to the input. Answers sound as responses to the input. This shows how unary constraints can have a global effect on the structure of the generated melodies.

The described method can be used to implement an augmented instrument, with which the user plays bebop melodies by targeting specific notes ahead of time. These targets are selected using a gesture controller and transformed into unary constraints, e.g., on the last note. The underlying harmony is provided in real-time by an mp3 file previously analyzed, from which time-lined harmonic metadata is extracted.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

What is claimed is:

1. A method for creating a Markov process that generates sequences, each sequence having a finite length L, comprising items from a set of a specific number n of items, and satisfying one or more control constraints specifying one or more requirements on the sequence, the method comprising:
   receiving data defining an initial Markov process of a specific order d and having an initial probability distribution;
   receiving data defining one or more control constraints;
   generating, by processing circuitry, data defining intermediary matrices, each matrix being of dimension $n^d$ by n, by zeroing out transitions in the initial Markov process data that are forbidden by the one or more control constraints, wherein generating data defining the intermediary matrices comprises defining a control satisfaction problem using the initial Markov process and the control constraint data, and filtering out transitions in the control satisfaction problem that are forbidden by the one or more control constraints using a local consistency algorithm;

generating, by the processing circuitry, data defining a final non-homogeneous Markov process by processing the intermediary matrices data, generating, by the processing circuitry, the sequences having the finite length L by using the final non-homogeneous Markov process data with random walk.

2. The method of claim 1, wherein the local consistency algorithm is an arc-consistency algorithm, path-consistency algorithm or strong-k-algorithm.

3. The method of claim 1, wherein the transitions in the initial Markov process data that are zeroed out correspond to the transitions that are filtered out in the control satisfaction problem using the local consistency algorithm.

4. The method of claim 1, wherein the generated sequences have the initial probability distribution.

5. The method of claim 4, wherein for each of the generated sequences, a ratio of the probability of said sequence according to the final non-homogenous Markov process data and the probability of said sequence according to the initial Markov process data is the same constant factor.

6. The method of claim 1, wherein processing the intermediary matrices data comprises individually normalizing each of the intermediary matrices.

7. The method of one of claim 6, wherein processing the intermediary matrices data comprises using a renormalization algorithm.

8. The method of claim 7, wherein the renormalization algorithm comprises back-propagating the normalizations in the intermediary matrices, starting from the last matrix.

9. The method of claim 7, wherein the renormalization algorithm is implemented using the formulas $$\tilde{m}_{j,k}^{(L-1)} = \frac{z_{j,k}^{(L-1)}}{\alpha_j^{(L-1)}}, \alpha_j^{(L-1)} = \sum_{k=1}^{n} z_{j,k}^{(L-1)}$$

$$\tilde{m}_{j,k}^{(i)} = \frac{\alpha_k^{(i+1)} z_{j,k}^{(i)}}{\alpha_j^{(i)}}, \alpha_j^{(i)} = \sum_{k=1}^{n} \alpha_k^{(i+1)} z_{j,k}^{(i)} \quad 0 < i < L - 1$$

$$\tilde{m}_k^{(0)} = \frac{\alpha_k^{(1)} z_k^{(0)}}{\alpha^{(0)}}, \alpha^{(0)} = \sum_{k=1}^{n} \alpha_k^{(1)} z_k^{(0)}$$

10. The method of claim 1, wherein the initial Markov process data is represented by a prior vector of dimension 1 by $n^d$ and a single transition matrix of dimension $n^d$ by n.

11. The method of claim 10, wherein the transition matrix of the initial Markov process is a stochastic transition matrix.

12. The method of claim 1, wherein at least one of the intermediary matrices is a non-stochastic transition matrix.

13. The method of claim 1, wherein the final non-homogeneous Markov process data is represented by a prior vector of dimension 1 by $n^d$ and L−1 transition matrices of dimension $n^d$ by n.

14. The method of claim 13, wherein each of the transition matrices of the final non-homogeneous Markov process data is a stochastic transition matrix for non-zeroed rows.

15. The method of claim 1, wherein the scope of the control constraints is the maximum number of consecutive items on which the constraint holds.

16. The method of claim 15, wherein the scope of the control constraints is equal or smaller than the specific order d of the initial Markov process.

17. The method of claim 1, wherein the one or more control constraints are unary, binary and/or tenary.

18. The method of claim 1, wherein at least one of the one or more control constraints requires a specific item at a specific position within the sequence.

19. The method of claim 1, wherein at least one of the one or more control constraints requires a specific transition between two positions within the sequence.

20. The method of claim 1, wherein the specific order d of the initial Markov process is two or higher.

21. The method of claim 1, wherein each sequence comprises items of music notes, text components, or drawings.

22. A non-transitory computer-readable medium having instructions stored thereon which, when carried out on a computer, cause the computer to perform the steps of the method as claimed in any of claims 1 to 21.

23. A sequence generator for creating a Markov process that generates sequences, each sequence having a finite length L, comprising items from a set of a specific number n of items, and satisfying one or more control constraints specifying one or more requirements on the sequence, the generator comprising:

processing circuitry configured to
receive data defining an initial Markov process of a specific order d and having an initial probability distribution;
receive data defining one or more control constraints;
generate data defining intermediary matrices, each matrix being of dimension $n^d$ by n, by zeroing out transitions in the initial Markov process data that are forbidden by the one or more control constraints, wherein generating data defining the intermediary matrices comprises defining a control satisfaction problem using the initial Markov process and the control constraint data, and filtering out transitions in the control satisfaction problem that are forbidden by the one or more control constraints using a local consistency algorithm;
generate data defining a final non-homogeneous Markov process by processing the intermediary matrices data, and
generate the sequences having the finite length L by using the final non-homogeneous Markov process data with random walk.

24. The sequence generator of claim 23, further comprising:
an input interface configured to receive one or more constraint inputs for generating the one or more control constraints data and/or configured to receive one or more input sequences for generating the initial Markov process data.

25. The sequence generator of claim 24, wherein the input interface is configured to receive data from a gesture recognition device and/or a physiological sensor.

* * * * *